United States Patent
Bk et al.

(10) Patent No.: US 10,482,026 B2
(45) Date of Patent: Nov. 19, 2019

(54) DEDUPLICATED HOST CACHE FLUSH TO REMOTE STORAGE

(71) Applicant: NetApp, Inc., Sunnyvale, CA (US)

(72) Inventors: Girish Kumar Bk, Bangalore (IN); Gaurav Makkar, Bangalore (IN)

(73) Assignee: NetApp Inc., Sunnyvale, CA (US)

( * ) Notice: Subject to any disclaimer, the term of this patent is extended or adjusted under 35 U.S.C. 154(b) by 0 days.

(21) Appl. No.: 15/816,029

(22) Filed: Nov. 17, 2017

(65) Prior Publication Data

US 2018/0074968 A1  Mar. 15, 2018

Related U.S. Application Data

(63) Continuation of application No. 14/814,053, filed on Jul. 30, 2015, now Pat. No. 9,830,273.

(51) Int. Cl.
| | | |
|---|---|---|
| G06F 3/06 | (2006.01) | |
| G06F 12/0891 | (2016.01) | |
| G06F 12/0868 | (2016.01) | |
| G06F 12/0802 | (2016.01) | |
| G06F 12/0804 | (2016.01) | |

(52) U.S. Cl.
CPC ........ G06F 12/0891 (2013.01); G06F 3/0604 (2013.01); G06F 3/065 (2013.01); G06F 3/067 (2013.01); G06F 3/0641 (2013.01); G06F 3/0656 (2013.01); G06F 12/0868 (2013.01); *G06F 3/0608* (2013.01); *G06F 12/0802* (2013.01); *G06F 12/0804* (2013.01); *G06F 2212/60* (2013.01)

(58) Field of Classification Search
CPC ........ G06F 2212/222; G06F 2212/311; G06F 3/0656; G06F 3/0659; G06F 3/0641; G06F 17/30156
See application file for complete search history.

(56) References Cited

U.S. PATENT DOCUMENTS 8,140,821 B1 * 3/2012 Raizen ............... G06F 11/1448
707/637
9,760,574 B1 * 9/2017 Zhai .................. G06F 17/30091
(Continued)

OTHER PUBLICATIONS

"15816029 0001 CL1 Sorenson" Examiner's detailed citations to figures and page:paragraph numbers in US 2013/0007219.*
(Continued)

*Primary Examiner* — Charles Rones
*Assistant Examiner* — Andrew Russell
(74) *Attorney, Agent, or Firm* — Cooper Legal Group, LLC

(57) ABSTRACT

In addition to caching I/O operations at a host, at least some data management can migrate to the host. With host side caching, data sharing or deduplication can be implemented with the cached writes before those writes are supplied to front end storage elements. When a host cache flush to distributed storage trigger is detected, the host deduplicates the cached writes. The host aggregates data based on the deduplication into a "change set file" (i.e., a file that includes the aggregation of unique data from the cached writes). The host supplies the change set file to the distributed storage system. The host then sends commands to the distributed storage system. Each of the commands identifies a part of the change set file to be used for a target of the cached writes.

20 Claims, 10 Drawing Sheets

(56) References Cited

U.S. PATENT DOCUMENTS

| | | |
|---|---|---|
| 2005/0144396 A1 | 6/2005 | Eschmann et al. |
| 2010/0199042 A1 | 8/2010 | Bates et al. |
| 2011/0238634 A1* | 9/2011 | Kobara ................ G06F 3/0608 707/692 |
| 2012/0016845 A1 | 1/2012 | Bates |
| 2012/0173656 A1 | 7/2012 | Sorenson, III |
| 2013/0007219 A1* | 1/2013 | Sorenson, III ...... H04L 67/1095 709/219 |
| 2013/0282673 A1 | 10/2013 | Fiske et al. |
| 2014/0136789 A1 | 5/2014 | Madan et al. |
| 2014/0289476 A1 | 9/2014 | Nayak |
| 2015/0213047 A1 | 7/2015 | Madan |
| 2016/0034212 A1 | 2/2016 | Zhu et al. |

OTHER PUBLICATIONS

Arteaga, et al., "Client-side Flash Caching for Cloud Systems," SYSTOR 2014 Proceedings of International Conference on Systems and Storage, ACM New York, NY, 2014, pp. 1-11.

* cited by examiner

DEDUPLICATED HOST CACHE FLUSH TO REMOTE STORAGE

CLAIM FOR PRIORITY

The present application is a continuation of U.S. application Ser. No. 14/814,053, filed Jul. 30, 2015, which is hereby incorporated herein by reference in its entirety.

BACKGROUND

The disclosure generally relates to the field of data management, and more particularly to data management for resource consumption efficiency.

A distributed storage system can be structured with front end storage and back end storage. The front end storage includes devices (e.g., servers, filers, etc.) and applications on those devices that are "client facing." The front end storage elements (i.e., devices and applications) are characterized as client facing because they are exposed to clients to receive requests and provide responses. An entity considered a client is also often referred to as a host since it hosts an application(s). The application performs operations, some of which involve reading data from storage and writing data to storage. The front end storage elements interact with back end storage elements to carry out these reads and writes. The back end storage elements can include storage arrays and the corresponding controllers. In some cases, the front end storage elements and at least some back end storage elements are within a same housing.

Managing data in distributed storage systems includes performing operations for storage efficiency. Deduplication or block sharing is a technique for storage efficiency with respect to storage space consumption. For deduplication, data of different write operations are compared to determine whether the data is the same. This often involves generation of fingerprints based on the data and comparison of the fingerprints. A fingerprint match is eventually validated with the actual data to avoid a fingerprint collision, despite the low likelihood of a fingerprint collision. After match validation, metadata of the data units to be written will refer to a same storage location.

SUMMARY

In addition to caching I/O operations at a host, at least some data management can be migrated to the host. With host side caching, data sharing or deduplication can be implemented with the cached writes before those writes are supplied to front end storage elements. When a host cache flush to distributed storage trigger is detected, the host deduplicates the cached writes. The host aggregates data based on the deduplication into a "change set file" (i.e., a file that includes the aggregation of unique data from the cached writes). The host supplies the change set file to the distributed storage system. The host then sends commands to the distributed storage system. Each of the commands identifies a part of the change set file ("donor") to be used for a target of the cached writes ("recipient").

This summary is a brief summary for the disclosure, and not a comprehensive summary. The purpose of this brief summary is to provide a compact explanation as a preview to the disclosure. This brief summary does not capture the entire disclosure or all aspects, and should not be used to limit claim scope.

BRIEF DESCRIPTION OF THE DRAWINGS

Aspects of the disclosure may be better understood by referencing the accompanying drawings.

DESCRIPTION

The description that follows includes example systems, methods, techniques, and program flows that embody aspects of the disclosure. However, it is understood that this disclosure may be practiced without these specific details. For instance, the example illustrations refer to a file for ease of understanding. However, the disclosure can be applied to other data containers. Different platforms and storage systems refer to these data containers with different names including objects, volumes, and even "containers." In other instances, well-known instruction instances, protocols, structures and techniques have not been shown in detail in order not to obfuscate the description.

Introduction

As part of the myriad of distributed computing solutions (e.g., hybrid clouds, private clouds, software as a service, etc.) and availability of solid state storage devices, host or client side caching is being implemented. Caching storage input/output (I/O) in persistent cache of a host (e.g., solid state storage attached to the host, non-volatile memory, etc.) takes advantage of locality of data with respect to the application instance(s) accessing the data. This improves performance of the application instance(s) and reduces load on front end storage elements of a distributed storage system. Load is reduced on the front end storage elements since I/O requests from application instance(s) can be handled with the local persistent cache of the host.

Overview

In addition to caching I/O operations at a host, at least some data management can be migrated to the host. With host side caching, data sharing or deduplication can be implemented with the cached writes before those writes are supplied to front end storage elements. This partially offloads some data management from the front end storage elements and decreases consumption of network resources. When a host cache flush to distributed storage trigger is detected, the host deduplicates the cached writes. The host aggregates data based on the deduplication into a "change set file" (i.e., a file that includes the aggregation of unique data from the cached writes). The host supplies the change set file to the distributed storage system. The host then sends commands to the distributed storage system. Each of the copy identifies a part of the change set file ("donor") to be used for a target of the cached writes ("recipient"). Donor and source are used herein to refer to a data container (e.g., a file) or a part of a data container with data to be "shared" or copied. Recipient and destination are used herein to refer to a data container or a part of a data container that accepts the data of the donor (i.e., references the donor or source).

Example Illustrations

Figure 1:
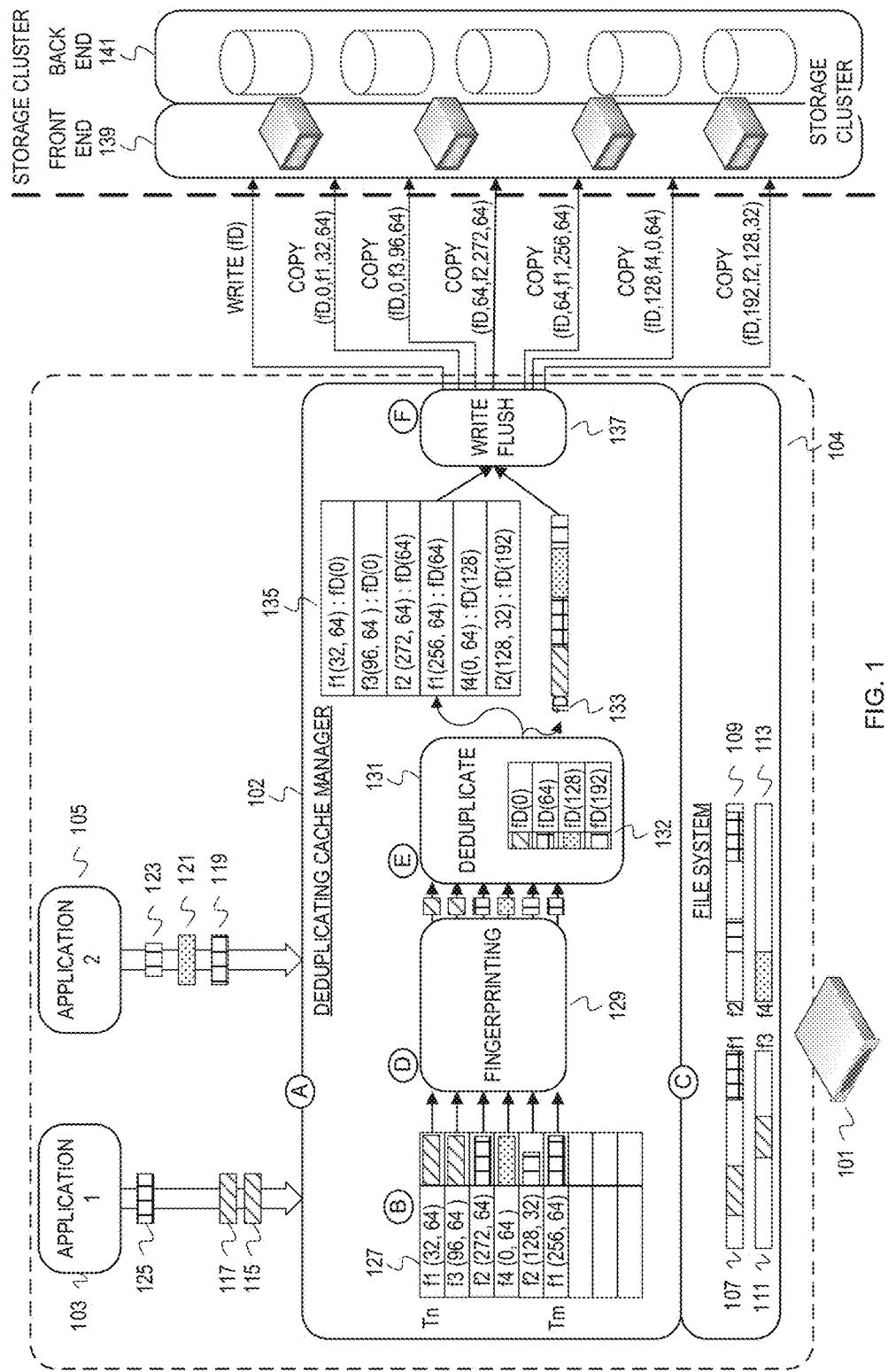
FIG. 1 depicts a conceptual diagram of flushing deduplicated cached writes from a host persistent cache to a distributed storage system.

FIG. 1 depicts a conceptual diagram of flushing deduplicated cached writes from a host persistent cache to a distributed storage system. In FIG. 1, a host 101 is in communication with a distributed storage system ("storage cluster") that includes a front end 139 and a back end 141. FIG. 1 depicts the front end 139 with 4 front end storage devices, but the front end 139 can include any number of devices. FIG. 1 depicts the back end 141 with 5 logical storage containers, which can represent any number of storage devices/arrays (e.g., flash based, disk based, tape based, hybrid storage, etc.). The storage cluster also includes network elements that are not depicted. The host 101 can be connected to the storage cluster via a public network, a private network, or both a public and a private network.

The host 101 hosts applications, a deduplicating cache manager 102, and a file system 104. The host 101 hosts an application instance 103 and an application instance 105. These can be instances of a same application or different applications. An "application" refers to a program or collection of programs and an "application instance" is a running instance of an application. The hosted application instances 103, 105 write to the file system 104. The file system 104 is backed by the storage cluster, which means the metadata and data of the file system 104 are persisted into the storage cluster.

FIG. 1 is annotated with a series of letters A-F. These represent stages of operations. Although these stages are ordered for this example, the stages illustrate one example to aid in understanding this disclosure and should not be used to limit the claims. Subject matter falling within the scope of the claims can vary with respect to the order and some of the operations.

At stage A, the application instance 103 and the application instance 105 perform writes to files. The application instance 103 writes data unit 115 of length 64 bytes to a file 107 ("f1") at offset 32 ("f1(32,64)"). The application instance 103 writes data unit 117 of length 64 bytes to a file 111 ("f3") at offset 96 ("f3(96,64)"). The application instance 105 writes data unit 119 of length 64 bytes to a file 109 ("f2") at offset 272 ("f2(272,64)"). The application instance 105 writes data unit 121 of length 64 bytes to a file 113 ("f4") at offset 0 ("f4(0,64)"). The application instance 105 writes data unit 123 of length 32 bytes to the file 109 at offset 128 ("f2(128,32)"). The application instance 103 writes data unit 125 of length 64 bytes to the file 107 at offset 256 ("f1(256,64)").

At stage B, the deduplicating cache manager 102 caches the writes from the application instances 103, 105 in a cache 127. The deduplicating cache manager 102 caches the writes in the cache 127 as produced by the application instances 103, 105. The writes can continue to the file system 104 at stage C or be written into the file system 104 in accordance with a local caching technique. The cache 127 is implemented in a persistent cache (e.g., solid state storage device, NVRAM, etc.), and is a cache with respect to the distributed storage system that includes the storage front end 139 and the storage back end 141. The cache 127 could also be used as a cache for the file system 104. The cache 127 is annotated with a "Tn" and "Tm." These are indications of time that may or may not be explicitly indicated in the cache 127. The time Tn is a time boundary corresponding to the write to file 107 of data 115. The time Tm is a later time boundary corresponding to the write to file 107 of the data 125. For this example illustration, a cache flush is triggered by a time based trigger. For instance, the time Tn can correspond to an end time for a snapshot instance x and the time Tm can correspond to an end time for a snapshot instance x+1. Detection of the time boundary Tm triggers a cache flush to distributed storage.

When the cache flush trigger is detected, the deduplicating cache manager 102 begins a series of processing operations in response to the cache flush trigger. These operations are presented in stages D-E. At stage D, a fingerprinting component 129 generates fingerprints for each of the cached data units. At stage E, a deduplicate component 131 uses the fingerprints from the fingerprinting component 129 to determine unique data units in the cache 127. The deduplicate component 131 aggregates the unique data units into a file 133 ("fD"). This file is referred to herein as a change set file because it includes a set of changes requested by the application instances. The deduplicate component 131 creates a fingerprint to change set file map ("fingerprint map") 132. The fingerprint map 132 associates each part of the file 133 with a corresponding unique fingerprint. The file 133 includes the data unit 115 at offset 0, the data unit 119 at offset 64, the data unit 121 at offset 128, and the data unit 123 at offset 192. The deduplicate component 131 also maintains a change set file map ("flush map") 135. The flush map 135 associates each cached write with a corresponding part of the change set file 133. The flush map 135 maps the writes f1(32,64) and f3(96,64) to fD(0); the writes f2(272, 64) and f1(256,64) to fD(64); the write f4(0,64) to fD(128); and the write f2(128,32) to fD(192).

At stage F, a write flush component 137 generates a series of commands to efficiently flush the writes to the storage cluster. The write flush component 137 uses the flush map 135 and the file 133 to generate these commands. With the exception of the command(s) to write the change set file, the commands for the cached writes write metadata and not data. The commands cause the remote storage system to update metadata to reference physical locations of the donor data. So, the commands for the cached writes do not lead to consumption of storage space in the distributed storage system beyond that occupied by recipient metadata. The write flush component 137 communicates a command to write the file 133 to the storage cluster front end 139. This is depicted as 'WRITE (fD)" in FIG. 1. Depending on design, the write flush component 137 may communicate the WRITE command to the storage cluster front end 139, the write flush component 137 may provide the WRITE command to the deduplicating cache manager 102 for transmission to the storage cluster front end 139, the write flush component 137 may provide the WRITE command to another process for transmission to the storage cluster front end 139, etc. After transmission of the command to write the change set file, the write flush component 137 creates a COPY command for each of the cached writes in accordance with the flush map 135 and communicates these COPY commands to the storage cluster front end 139. This example refers to a COPY command defined by the Network File Sharing protocol as an example. This can be carried out by the distributed storage system as a copy, but storage efficiency can be gained if the data is shared. The COPY command can implement an extension that allows for a requestor or client to set a value (e.g., flag) in the COPY command to request that the data be shared instead of copied if possible. The distributed storage system can then share the data instead of copying the data if possible. An explicit share command, whether proprietary or complying with a standardized protocol, can be used instead of the COPY command suggested in this example illustration. To "share" data, a storage front end device sets the metadata of the recipient to reference the donor. Thus, overhead of a copy or transfer as well as additional storage space consumption can be avoided. The write flush component 137 generates a COPY command that specifies the data in the file "fD", which has been written into the storage cluster, at offset 0 for a length of 64 bytes as a donor and the file "f1" at offset 32 as a recipient. The write flush component 137 generates a COPY command that specifies the data in the file "fD" at offset 0 for a length of 64 bytes as a donor and the file "f3" at offset 96 as a recipient. The write flush component 137 generates a COPY command that specifies the data in the file "fD" at offset 64 for a length of 64 bytes as a donor and the file "f2" at offset 272 as a recipient. The write flush component 137 generates a COPY command that specifies the data in the file "fD" at offset 64 for a length of 64 bytes as a donor and the file "f1" at offset 256 as a recipient. The write flush component 137 generates a COPY command that specifies the data in the file "fD" at offset 128 for a length of 64 bytes as a donor and the file "f4" at offset 0 as a recipient. The write flush component 137 generates a COPY command that specifies the data in the file "fD" at offset 192 for a length of 32 bytes as a donor and the file "f2" at offset 128 as a recipient.

This example illustration shows a reduction of writing six data units by the application instances to a write of four data units to the storage cluster. The reduced load on the network carrying the data from the host to the storage cluster becomes significant beyond this simple illustration. Instead of several writes, thousands of writes can be consolidated into a change set file(s) and reduce the network resource consumption. In addition, the efficiency gains go beyond the time boundaries mentioned in FIG. 1. A change set file created from one time period can be used for a cache flush in a different time period.

Figure 2:
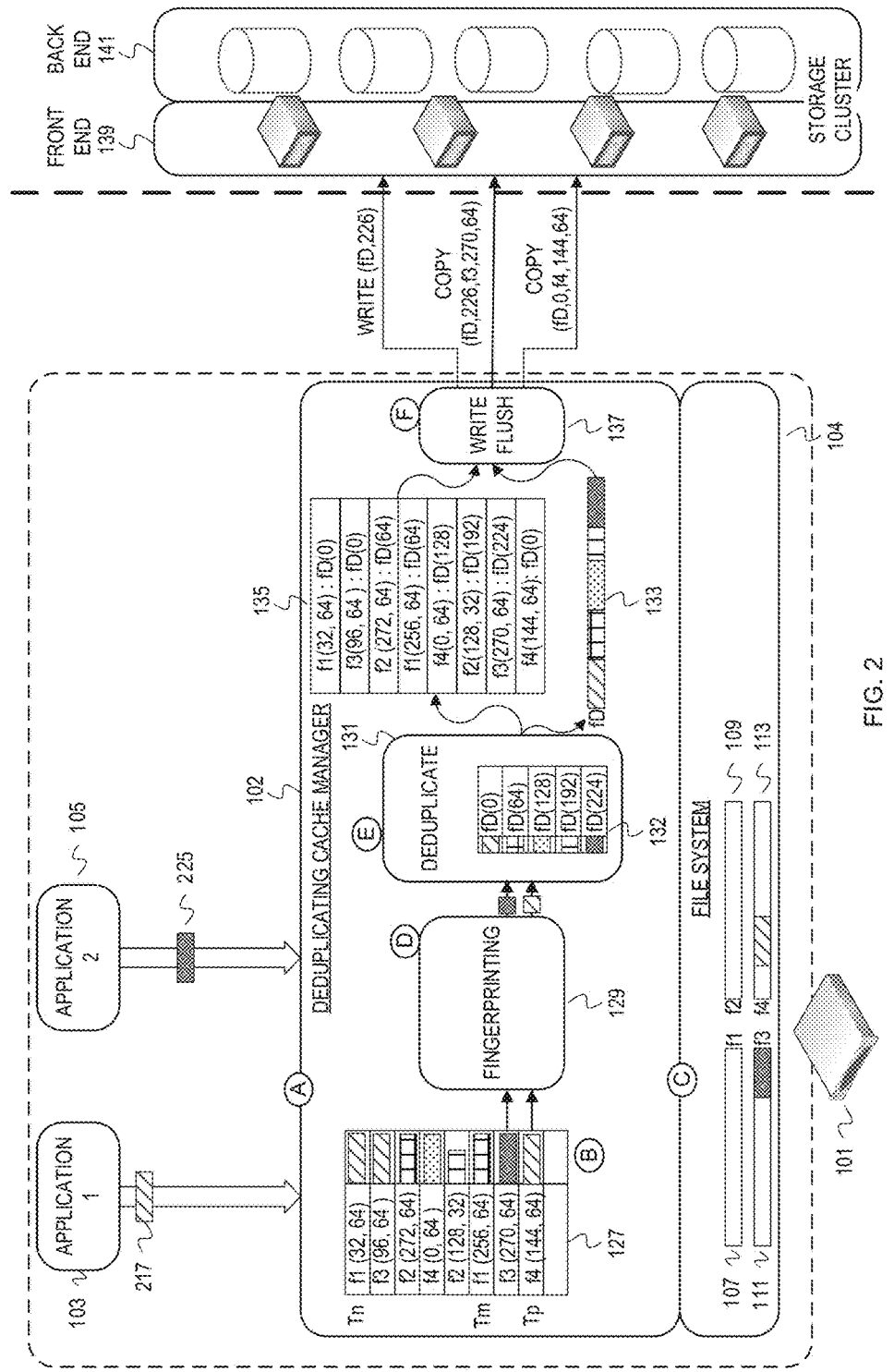
FIG. 2 depicts a conceptual diagram of a subsequent host cache flush of deduplicated cached writes from a host persistent cache to a distributed storage system.

FIG. 2 depicts a conceptual diagram of a subsequent host cache flush of deduplicated cached writes from a host persistent cache to a distributed storage system. FIG. 2 uses the same elements of FIG. 1. In FIG. 2, the application instances 103, 105 are performing writes to files in a time period Tm+1 to Tp, which follows the time period Tn to Tm. FIG. 2 depicts the same series of stages as depicted in FIG. 1, but with different data units being written.

At stage A, the application instance 103 and the application instance 105 perform writes to files. The application instance 105 writes data unit 225 of length 64 bytes to a file 111 ("f3") at offset 270 ("f3(270,64)"). The application instance 103 writes data unit 217 of length 64 bytes to a file 113 ("f4") at offset 144 ("f4(144,64)").

At stage B, the deduplicating cache manager 102 caches the writes from the application instances 103, 105 in the cache 127. The deduplicating cache manager 102 caches the writes in the cache 127 as produced by the application instances 103, 105. The writes can continue to the file system 104 at stage C or be written into the file system 104 in accordance with a local caching technique. The cache 127 is annotated with a "Tp," as well as the "Tn" and "Tm."
These are indications of time that may or may not be explicitly indicated in the cache 127. The time Tp is a time boundary corresponding to the write to file 113 of data 217. Again, a cache flush is triggered by a time based trigger. For instance, the time Tp can correspond to an end time for a snapshot instance x+2. Detection of the time boundary Tp triggers a cache flush to distributed storage.

When the cache flush trigger is detected, the deduplicating cache manager 102 begins a series of processing operations in response to the cache flush trigger. These operations are presented in stages D-E. At stage D, the fingerprinting component 129 generates fingerprints for each of the cached data units. At stage E, the deduplicate component 131 uses the fingerprints from the fingerprinting component 129 to determine unique data units in the cache 127 for the time period Tm+1 to Tp. The deduplicate component 131 appends the unique data units of this time period to the file 133 ("fD"). The deduplicate component 131 updates the fingerprint map 132 to associate the fingerprint for the data unit 225 with offset 224 of the file 133. The file 133 has been updated to include the data unit 225 starting at offset 224. The deduplicate component 131 also updates the flush map 135 to associate the write f3(270,64) to fD(224) and to associate the write f4(144,64) to fD(0). This illustrates leveraging deduplication across flush boundaries, depending upon the size of the persistent host cache.

At stage F, the write flush component 137 generates a series of commands to efficiently flush the writes to the storage cluster. The write flush component 137 uses the flush map 135 and the file 133 to generate these commands. The write flush component 137 first communicates a command to write to the file fD in the storage cluster. This is depicted as 'WRITE (fD,226)" in FIG. 2. The write flush component 137 then creates a copy command for each of the cached writes in accordance with the flush map 135 and communicates these commands to the storage cluster front end 139. The write flush component 137 generates a command to copy the data in the file "fD" in the storage cluster at offset 226 for a length of 64 bytes to the file "f3" at offset 270. The write flush component 137 generates a command to copy the data in the file "fD" at offset 0 for a length of 64 bytes to the file "f4" at offset 144.

Figure 3:
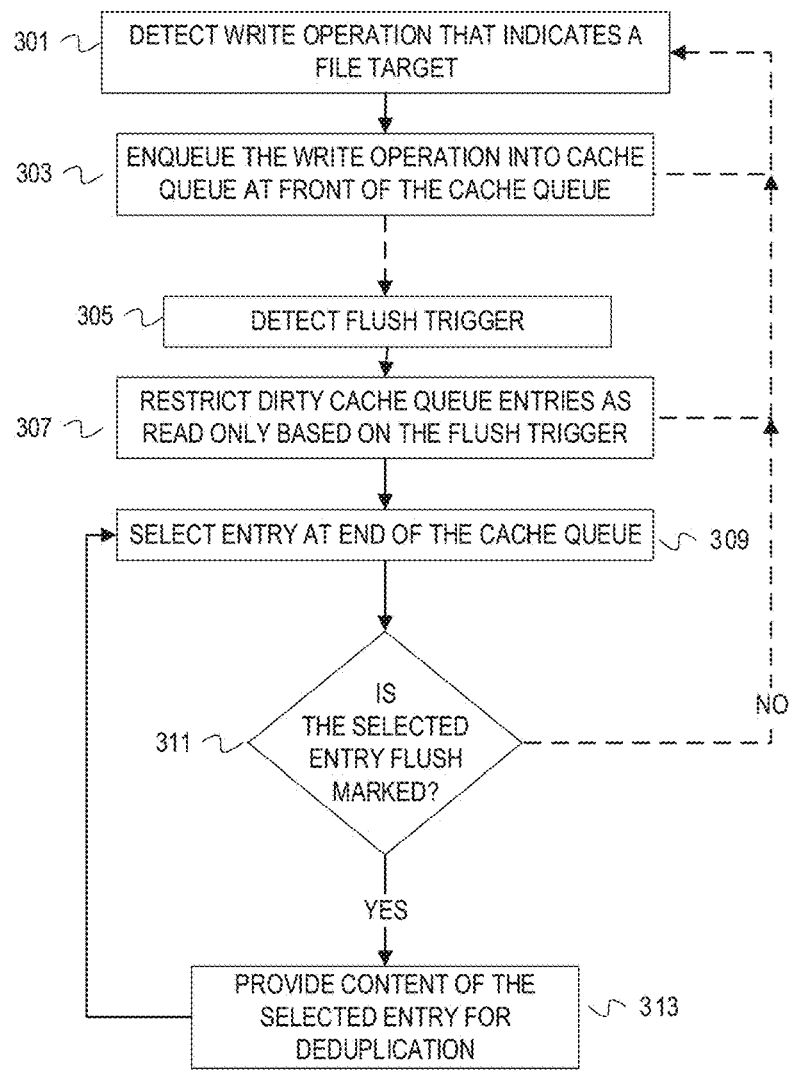
FIG. 3 is a flowchart of example operations for host side caching of writes and cache flushing with a double ended queue for the persistent cache.
Figure 4:
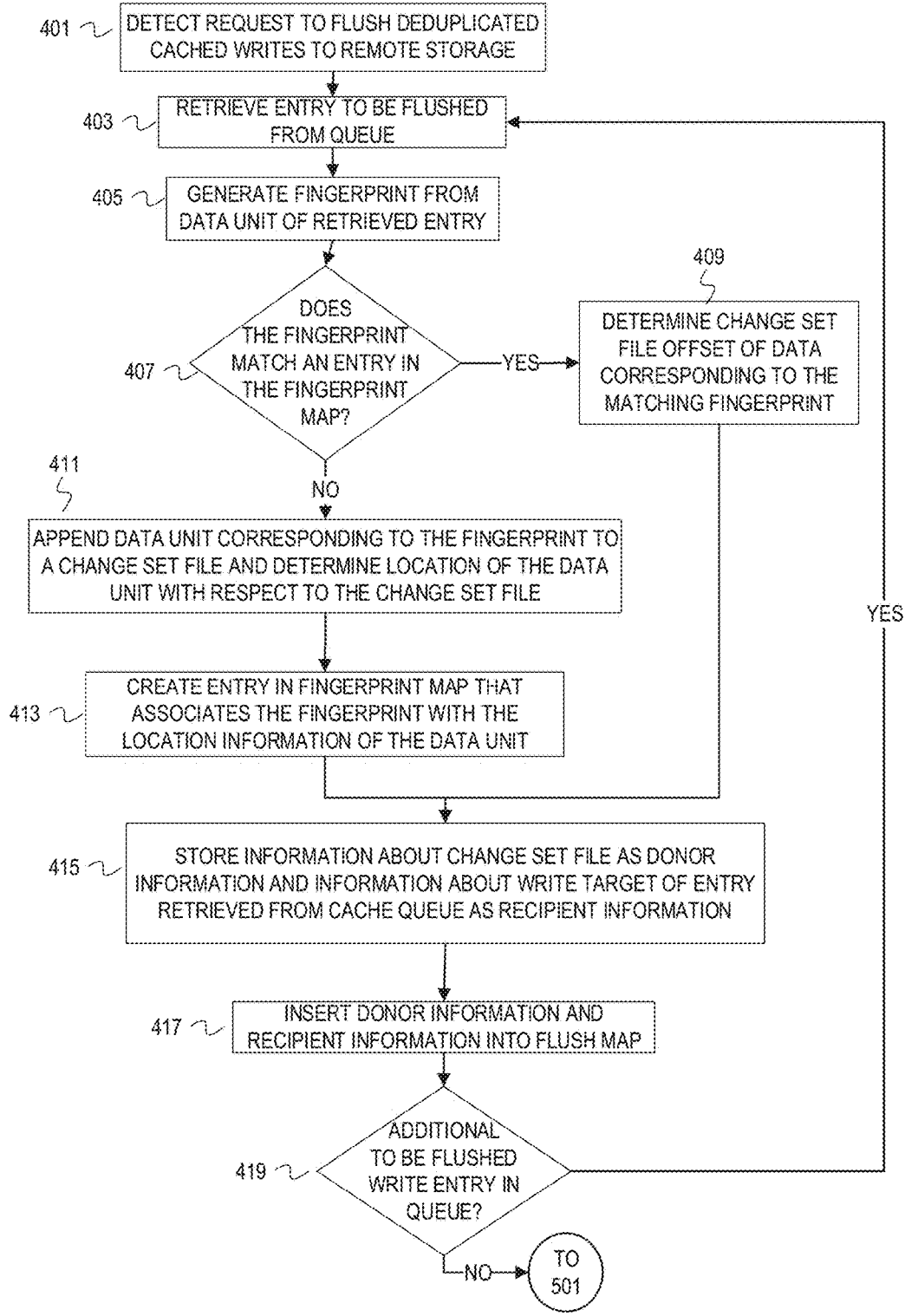
FIGS. 4-5 depict a flowchart of example operations for efficiently flushing the dirty entries of the host cache to distributed storage.
Figure 5:
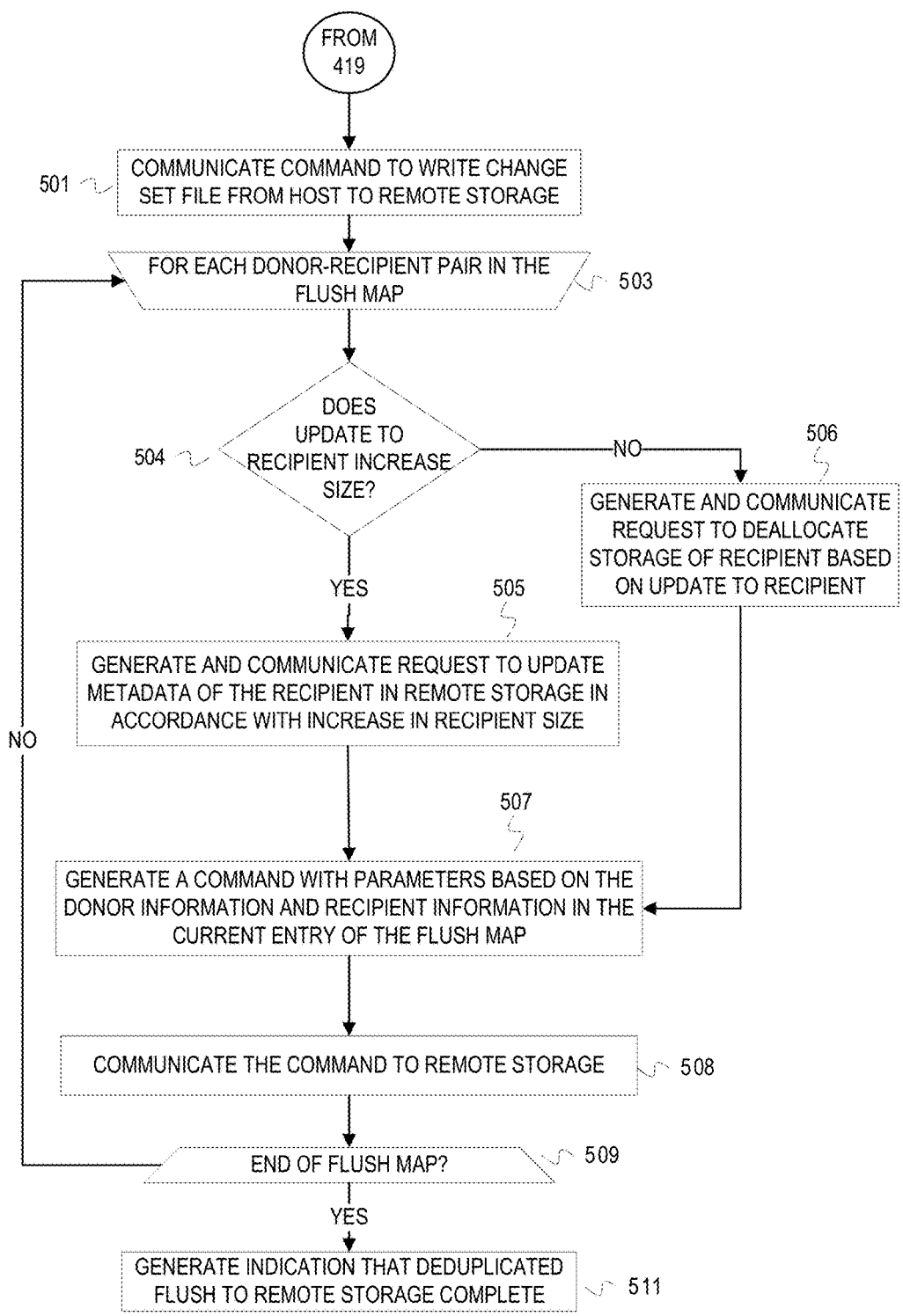
Figure 6:
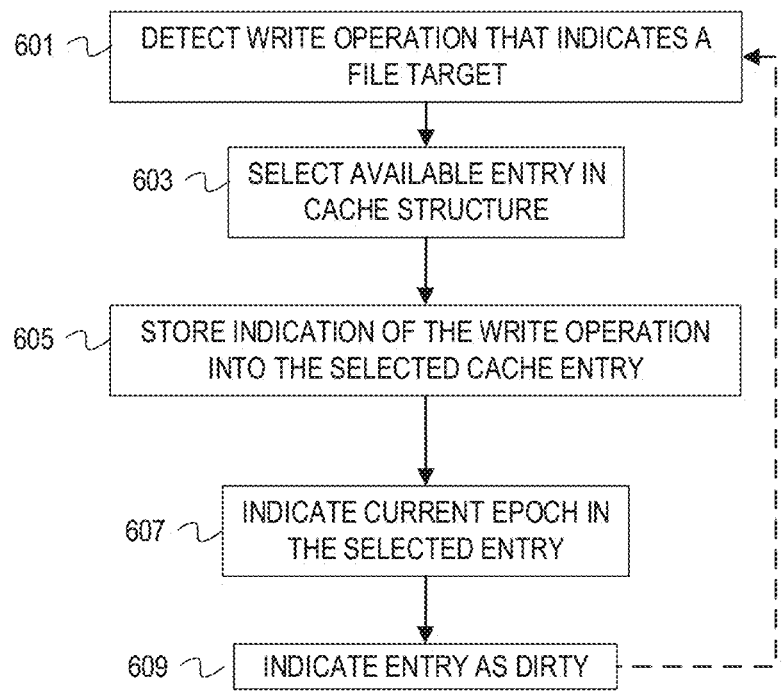
FIG. 6 is a flowchart of example operations for host side caching of writes into persistent based on epochs.
Figure 7:
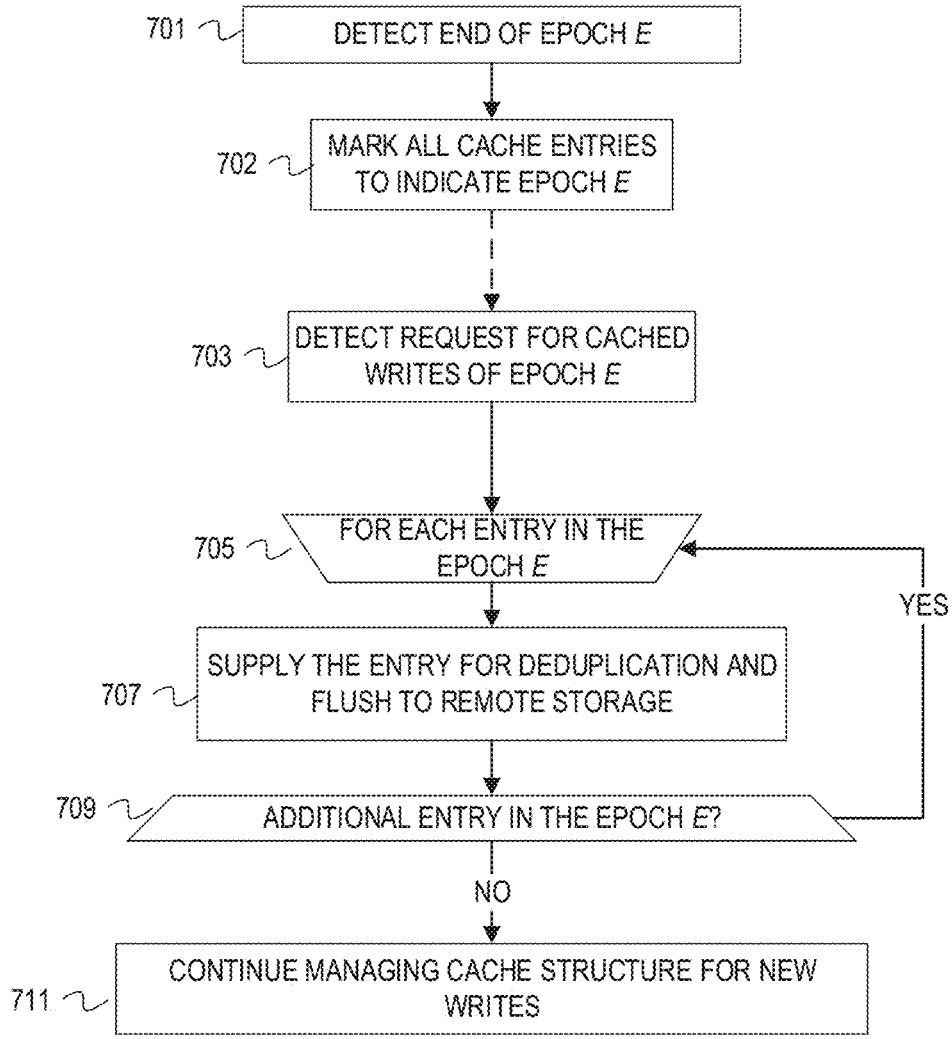
FIG. 7 is a flowchart of example operations for updating the cache structure when an end of an epoch is detected.
Figure 8:
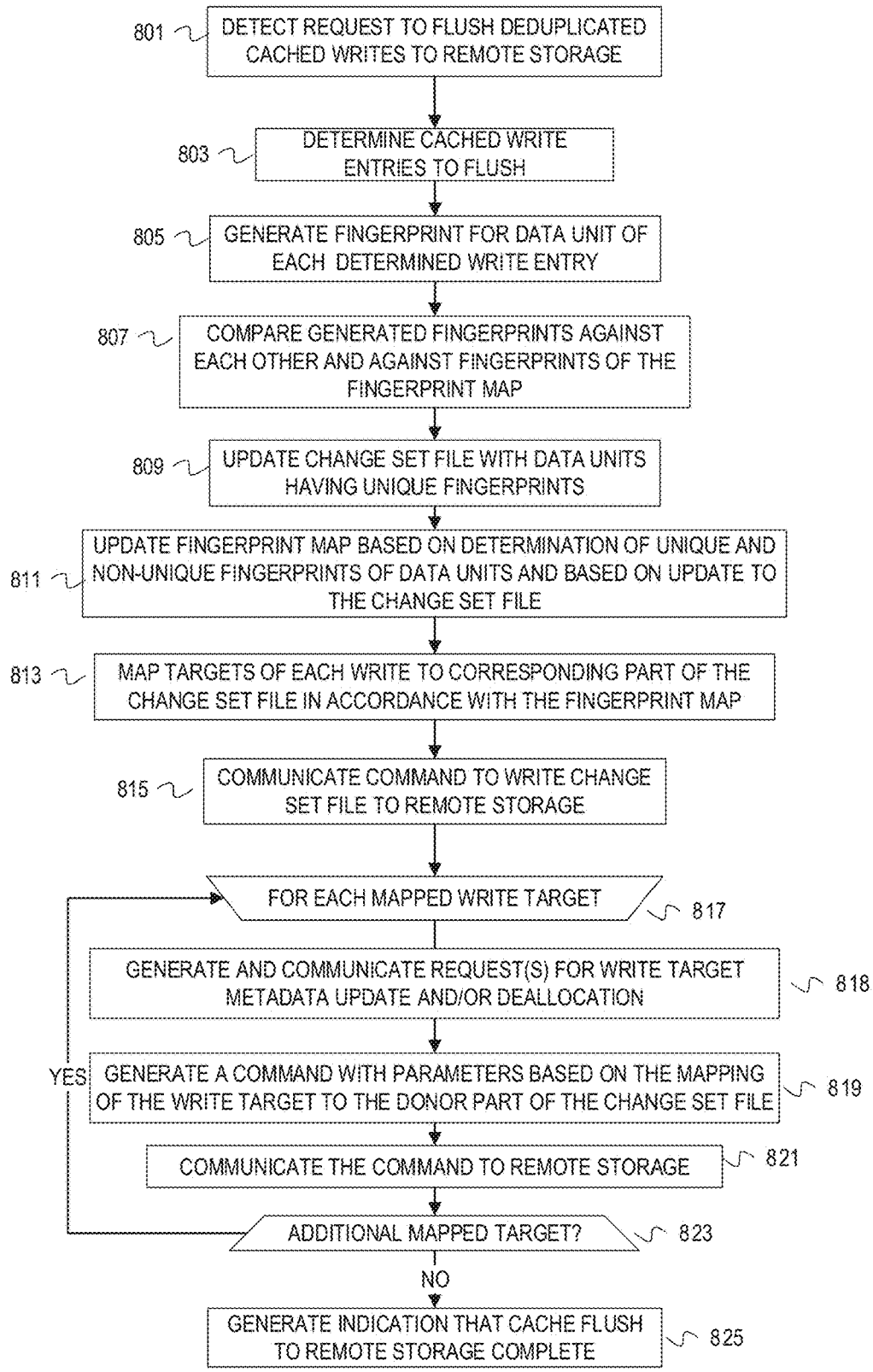
FIG. 8 is a flowchart of example operations for deduplicating cached writes and flushing the deduplicated writes to remote storage.

FIGS. 1 and 2 provided a basic example for introducing host to distributed storage deduplicated cache flushing. The following figures provide flowcharts of example operations for different aspects of this efficient host cache flushing to distributed storage. FIGS. 3-5 present example operations that presume a double ended queue implementation of the persistent host side cache and a copy command parameter list. FIGS. 6-8 present example operations that presume an epoch based cache flush trigger. Dashed lines in the flowcharts indicate asynchronous flow of operations. For instance, a dashed line between example operations can represent a state of waiting for a response, trigger, generation of a result, or event. A dashed line can also indicate that program code has completed until invoked again.

FIG. 3 is a flowchart of example operations for host side caching of writes and cache flushing with a double ended queue for the host cache. FIG. 3 refers to a caching component as performing the example operations. This presumes a modularized implementation of the deduplicating cache manager of FIGS. 1 and 2. The example operations refer to the cache manager for consistency with FIGS. 1 and 2, word efficiency aside, and not because a "cache manager" is required to perform the example operations. Thus, the claims are not limited to a program or circuitry identified as a cache manager.

At block 301, a caching component detects a write operation that indicates a file target. An application instance submits a write operation that targets a location within a file. The write operation typically indicates a file handle, an offset, and data to be written to the indicated location within the identified file. The write operation can also indicate the length of the data to be written. The caching component can take any one of a variety of forms on a host. The caching component could be an application running in application space of the host. The application instance can be configured to submit the write operation to a particular process identifier or logical socket associated with the caching component in accordance with an inter-process communication mechanism of the host. After processing the write operation, the caching component can pass the write operation to the file system of the host. The caching component could also be a component of a virtualization manager, an operating system of a virtual machine on the host, or an operating system of the host. An application instance would call a function or procedure of the operating system to carry out the write operation. This call would invoke the caching component. The caching component could also monitor a memory location defined for write operations from an application space of the host. When a write operation is written into this defined memory location, the caching component and file system can access the write operation.

At block 303, the caching component enqueues the write operation into a cache queue. The cache queue is a double ended queue defined in a persistent cache of the host. The caching component enqueues write operations at a first end of the double ended queue ("front of the cache queue") and dequeues from a second end of the double ended queue ("back of the cache queue"). The enqueued write operation is indicated as a dirty entry coincident with enqueueing. After enqueueing the write operation, the caching component operates depending upon whether another write operation is detected or a flush trigger is detected. If another write operation is detected, then flow returns to block 301.

At block 305, the caching component detects a cache flush trigger. The cache flush trigger can take a variety of forms. A cache flush trigger can be time based, as in the example illustrations of FIGS. 1 and 2. Although time based, the time is relative to an event or action. For instance, a snapshot request is detected at a time Tm. This triggers actions or operations to quiesce write operations from application instances. The cached writes that fall into the time period relative to the snapshot request ("snapshot based epoch") are flushed from the host cache. Although this disclosure refers to a snapshot based epoch, the claims are not so limited. An epoch can be based on other events or actions (e.g., migration event, maintenance event, etc.). A time based flush trigger can also be a defined/configured time window for flushing the host side cache. For instance, every t seconds the operating system generates an interrupt or notification to the caching component to trigger a flush. Another application running on the host can communicate the flush trigger to the caching component. The cause of the flash trigger can originate locally or remotely, for example from a snapshot manager or cluster manager remote from the host.

At block 307, the caching component marks dirty cache queue entries as read only based on the flush trigger. The caching component can set a bit or field to indicate the read restriction and the read restriction can be used as an implicit indication that the entry is to be flushed. The caching component can also explicitly indicate that an entry is "to be flushed" with a bit of value that is separate from an indication of restricting access permission to read only. Inversely, the explicit indication of "to be flushed" can be interpreted by the caching component as a read restriction. Which entries are marked depends upon the triggering mechanism. For instance, the caching component may identify cache queue entries that fall into an epoch preceding the flush trigger. The cache queue may only host write operations for a single epoch or can host write operations across multiple epochs. In the first case, the caching component marks all entries as restricted to read only and/or to be flushed ("flush marked"). In the second case, the caching component can mark all dirty entries for the flushing operation. If time information is also indicated in the cache queue, then the caching component can use the time information of each cached write to determine whether it falls into the epoch preceding the flush trigger. A dashed line proceeds from block 307 to block 301 in case a cache queue can accommodate writes outside of a flush trigger. In other words, a caching component may begin caching writes that occur after the flush trigger after marking the previously cached writes to indicate "to be flushed" and/or read restricted. After marking the relevant cached writes, the caching component begins processing the flush marked entries for supplying the cached writes for deduplicating.

At block 309, the caching component selects an entry at the end of the cache queue. For instance, the caching component selects the entry referenced by a pointer used to track an end of the cache queue.

At block 311, the caching component determines whether the selected entry is "flush marked." In other words, the caching component determines whether a permission and/or value has been set to indicate that the entry indicates it is being flushed and has been restricted to being read. If the selected entry is not flush marked, then the flush marked entries have been processed and the caching component returns to waiting for another write operation. If the selected entry is flush marked, then control flows to block 313.

At block 313, the caching component provides the selected entry for deduplication. To provide the selected entry, the caching component passes the write operation indicated in the selected entry (e.g., data to be written, file target, etc.) to a queue defined for a deduplication process, or passes content of the selected entry to data sharing or deduplicating program code. Entries can persist in the cache queue until evicted in accordance with an eviction mechanism used for the cache queue. Control returns to block 309 from block 313.

FIGS. 4-5 depict a flowchart of example operations for efficiently flushing the dirty entries of the host cache to distributed storage. FIGS. 4 and 5 refer to a host as performing the operations since it is possible for a multiple components, either software or hardware, to perform different aspects of the example operations.

At block 401, the host detects a request to flush deduplicated cache writes to remote storage. The request may be from the operating system, a managing application (e.g., a cluster manager), a data management application (e.g., snapshot application), etc. The host can detect the request as an inter-process message, a network message, an interrupt, etc.

At block 403, the host retrieves an entry to be flushed from a queue, which may be the cache queue or a queue defined for deduplication. Assuming separate queuing structures for caching and deduplication, a process associated with the caching component can provide flush marked entries from the cache queue to the queue of the deduplication component. The deduplication could also retrieve flush marked entries from the cache queue and install them into the queue associated with the deduplication component.

The caching component and the deduplication component can also share the cache queue. The caching component can notify the deduplication component when the deduplication component can read entries from the cache queue for the deduplication process.

At block 405, the host generates a fingerprint from the data unit of retrieved entry. The retrieved entry includes or indicates a data unit to be written. The host generates a fingerprint for that data. The fingerprint is a compact representation of the data, usually substantially smaller than the data. A variety of fingerprinting algorithms can be used to generate the fingerprint (e.g., the Karp-Rabin algorithm and cryptographic hash algorithms).

At block 407, the host determines whether the generated fingerprint matches an entry in a fingerprint map. As fingerprints are generated, a fingerprint map is maintained that associates each unique fingerprint (unique with respect to the fingerprint map) with a source or donor. The source or donor can include identifying information, such as a file handle and offset or address of the donor data used to create a first instance of the fingerprint. If the fingerprint matches an entry in the fingerprint map, then control flows to block 409. If the fingerprint does not have a match in the fingerprint map, then control flows to block 411.

At block 409, the host determines a change set file offset of data corresponding to the matching fingerprint. As described previously, a change set file is an aggregation of unique data from cached writes. Each data unit located at a particular offset within the change set file. Since a fingerprint already exists in the fingerprint map, the corresponding data has already been written to the change set file. The change set file can be maintained in a host file system, the persistent cache in which the cache queue resides, a separate persistent storage/memory of the host, etc. The fingerprint map identifies the donor with the file handle of the change set file and the offset of the corresponding data unit. Control flows from block 409 to block 415.

If the fingerprint generated from the retrieved cache queue entry did not match an entry in the finger print map, then the host appends the data unit corresponding to the fingerprint to the change set file at block 411. If a change set file has not yet been created, then the host creates the change set file with the data unit. When creating the change set file with the data unit or appending the data unit to the change set file, the host also determines location information for the data unit with respect to the change set file. The location information can be an offset in addition to the file handle for the change set file. It should be understood that "appending" the data unit does not necessarily mean the data unit is written to a contiguous location after a preceding data unit of the change set file. The term "appending" is used to logically present cumulative construction of the change set file. The underlying storage mechanism may write the data unit anywhere, and the "appending" is a logical construction. Thus, the offset and file handle could be considered a logical location identifier, which is resolved to a physical location of the data unit.

At block 413, the host creates an entry in the fingerprint map that associates the fingerprint with the location of the data unit in the change set file. For instance, the host inserts an entry into the fingerprint map that associates the fingerprint with the file handle of the change set file and an offset within that file of the data unit. Thus, the data unit within the change set file is the donor data for matches to the fingerprint.

At block 415, the host stores information about the change set file as donor information and information about the write target of the entry retrieved from the queue as recipient information to generate commands for the flush to remote, distributed storage. For instance, the host creates a copy parameter structure. The host creates the copy parameter structure with the donor information about the change set file and recipient information. For example, the host creates a copy parameter structure that indicates a file handle of the change set file and location of the donor data unit within the change set file (e.g., offset). The host can also indicate in the copy parameter structure recipient parameters, which can be a file handle of the recipient and location of a sharing data unit or deduplicated data unit within the recipient file.

At block 417, the host inserts the stored donor information and recipient information into the flush map. The flush map includes data that maps write targets (e.g., file name/file handle, offset at which to write a data unit, and length of a data unit) to a corresponding parts of the change set file (e.g., file name/file handle of the change set file and offset of the corresponding data unit within the change set file).

At block 419, the host determines whether there is an additional to be flushed write entry in the queue. If there is an additional write entry to be flushed, then control flows back to block 403. Otherwise, control continues to block 501 of FIG. 5.

FIG. 5 depicts example operations that continue from the example operations of FIG. 4. At block 501, the host communicates a command to write the change set file from the host into the remote, distributed storage. For example, the host generates and communicates a network file system (NFS) write command, which can be a remote procedure call. The host could communicate a command to write the change set file in accordance any of a variety of protocols that support a distributed storage model. The command may not be to write the entire change set file, if only a part of the change set file has been updated within boundaries of a current flush trigger.

At block 503, the host begins iterative operations for each donor-recipient pair in the flush map. For example, the host traverses the flush map and selects each entry, which has a mapping of change set file based donor information to cached write target recipient information.

At block 504, the host determines whether the update to the recipient increases the size of the recipient. If the cached write results in an increase in size of the recipient, then metadata of the recipient will be updated to allocate additional logical representation(s) of the data unit(s) leading to the increased size. Typically, this metadata update for an additional logical representation occurs coincident with the request to write the data unit. But no data unit is actually being written in the recipient when a share is performed. Thus, a separate request preceding the copy/share command is generated and sent to the remote, distributed storage system to prepare the metadata to accommodate the share. A change to an already existing logical representation of a data unit (e.g., a file block number) will be done as a consequence of the share/copy command, but the corresponding physical storage is not released in correspondence with the share. If the host determines that size of the recipient will increase, then control flows to block 505. Otherwise, control flows to block 506.

At block 505, the host generates a request to update metadata of the recipient in the remote, distributed storage in accordance with the update to the recipient. As described above, this metadata update prepares the metadata for the subsequent copy/share command for the donor recipient. The logical representation of a data unit references a physical location of data. So, the logical representation of the data unit (i.e., metadata) is updated to reference the physical location (or what is presented as a physical location) of the donor's data. Depending on the file system/storage system, metadata can include multiple levels of logical representation that resolve to physical locations. For instance, the hierarchy can include an extent that references multiple logical block identifiers with each of the logical block identifiers referencing a physical block in storage. Using file block numbers (FBNs) to illustrate and assuming a recipient "fool", the host can generate and communicate a request that indicates a data unit to be written to fool has a size of 143 bytes. Assuming block sizes of 8 bytes, the remote storage system will update the metadata to allocate an extent of 144 bytes and 18 FBNs referenced by the extent. Although the FBNs and the extent are created in metadata of fool, physical blocks in storage are not allocated. Control flows from block 505 to block 507

At block 506, the host generates and communicates a request to deallocate storage of the recipient based on the update to the recipient. Referring again to the example of fool, a cache write may update an existing block of fool, for example FBN 24. When the remote storage performs a share, FBN 24 is updated to reference the corresponding physical block of the donor. But the existing physical block corresponding to FBN 24 still exists. Thus, the host generates and communicates the release command to cause the remote storage system to deallocate the physical block. Different systems support different techniques for deallocating the physical block. One technique is referred to as "punching a hole" in a file. The host can generate the deallocate request to indicate the starting location of the share and the length of the data, for example a file offset and length. The remote storage system can use these parameters to populate a falloc( ) function, as an example, with the FALLOC_FL_PUNCH_HOLE flag set. Although presented as a different branch, deallocation may also be done when a file increases in size. For instance, the remote storage system may not have a capability to create logical representations of physical blocks without also allocating the physical blocks. In that case, the host can also generate and communicate a deallocate request after generating and communicating the request to update the metadata for an increase in a file size. Control flows from block 506 to block 507.

At block 507, the host generates a command with parameters based on the donor information and recipient information of a current entry in the flush map. The command parameters include parameters to identify source data to use for the recipient. The host will use the donor information, which is based on the change set file that was previously written to remote storage, as source parameters and the recipient information as destination parameters. For example, the host will set the change set file as the source file and the offset of the donor data unit within the change set file as a source offset. The host will set the write target file as the destination file and the offset in the write target file at which the data unit is to be written as the destination offset. The host can also indicate a length of the data unit to be used, which may have been specified in the cached write. As previously mentioned, the distributed storage system can share or copy the data. For example, the command can be a remote procedure call for copying as defined by a protocol, such as the NFS protocol and relevant extensions that allow for sharing instead of copying.

At block 508, the host communicates the command to the remote storage. The host can send the command with the user datagram protocol (UDP) or transmission control protocol (TCP), as examples. As illustrated in FIG. 1, a thousand writes may be reduced to 700 unique writes with deduplication of the thousand writes. Thus, the host will communicate 700 data units, one or more write commands to write the 700 data units as a change set file(s), and a thousand share or copy commands. This would consume fewer network resources than a thousand write commands with the corresponding thousand data units. In this simple example of a thousand host cached writes, the network carries 300 fewer data units at a cost of a single extra write command.

At block 509, the host determines whether the end of the flush map has been reached. The host can maintain a flush map that spans flush boundaries (i.e., the flush map can indicate donor-recipient pairs for a current flush and a preceding flush). In this case, the host can maintain references to indicate a beginning and end of flush map entries for a current cache flush. The host can also limit the flush map to donor-recipient pairs of a current flush. If there is an additional entry to process in the flush map, then control returns to block 503. Otherwise, control flows to block 511.

At block 511, the host generates an indication that the deduplicated host cache flush to remote storage has completed. This indication of flush completion allows the cache manager to remove the read only restriction and set flushed entries to "clean." Application instances and/or host side cache writing are likely quiesced coincident with detection of a cache flush trigger. The application instances and/or host side cache writing are then unquiesced after entries to be flushed in response to the cache flush trigger are restricted to reading. These dirty entries are treated (or are) read only entries while marked as dirty. A write that has a same or overlapping target as a dirty entry will be inserted as a new entry within the new flush boundaries (e.g., epoch).

As previously mentioned, this disclosure is not limited to a particular implementation of the persistent host side cache. The double ended queue presented in FIGS. 3-5 was one example. FIGS. 6-8 provide example operations that independent of a particular structure, but operate as epoch based host side cache flush.

FIG. 6 is a flowchart of example operations for host side caching of writes into persistent cache based on epochs. FIG. 6 refers to a host performing the operations. FIG. 6 is similar to FIG. 3. Aspects of FIG. 3 that could be repeated for FIG. 6 are not repeated to avoid unnecessary repetition. For instance, different examples of detecting a write operation are not repeated.

At block 601, a host detects a write operation that indicates a file target.

At block 603, the host selects an available entry in a cache structure. The cache structure can be a linked list, array, hash table, hybrid structure, first in first out queue, etc. For example, the cache structure could be a hash table that uses hash values of file handles and offsets as indexes into the hash table. The cache structure is stored in persistent cache that is local to the host. The persistent cache can be flash storage, disk storage, non-volatile memory, etc.

At block 605, the host stores an indication of the detected write operation into the selected entry. The host writes the file target information (e.g., file handle, offset) and data unit information (e.g., the data unit itself and length of the data unit) into the selected entry.

At block 607, the host indicates a current epoch in the selected entry. The host can write a time stamp of the write operation if the write operation metadata indicates a time of the write operation. Although an epoch is time based, it is relative to an event. So, the indication of the epoch may not be in a time metric (e.g., seconds). If an epoch is snapshot based, then the indication of the epoch may be a snapshot identifier.

At block 609, the host indicates the selected entry as "dirty." The host may not need to explicitly indicate the entry as dirty if an indication of "dirty" is a default setting when the cache structure is initially created.

FIG. 7 is a flowchart of example operations for updating the cache structure when an end of an epoch is detected. FIG. 7 continues referring to the host as performing the example operations.

At block 701, the host detects an end of an epoch E. The host may detect the end of an epoch by receiving a message or command from a data management component. For example, a periodic snapshot request or user initiated snapshot request can mark an end of an epoch. The event upon which an epoch is based can also be startup of the host or launching of an application. In this case, the host can detect the end of an epoch by observing passage of a defined amount of time from either the initial event (e.g., launching of an application) or from the preceding epoch.

At block 702, the host marks all cache entries to indicate the epoch E. If epoch information is explicitly maintained in the cache structure, then the host traverses the cache structure to mark those entries that lack epoch information to indicate epoch E. If epoch information is not indicated in the cache structure, the host may use a reference or cache structure element identifier (e.g., an index) to mark an entry that corresponds to the beginning of epoch E and mark an entry that corresponds to the end of epoch E. The host can use these beginning and end markers to select entry for flushing operations.

At block 703, the host detects a request for cached writes of epoch E. This detection of a request may be a message between components of the host. For example, a fingerprinting of deduplicating component can request the entries from a component that manages the cache structure.

At block 705, the host begins iterative operations for each entry in the epoch E in the cache structure.

At block 707, the host supplies the entry for deduplication and cache flush to remote storage. The host reads out the write operation indication to the component requesting the entries. The host can also read out the data units of the write operations or allow the requesting component to read the data units to reduce use of the host's bus for internal data transfers.

At block 709, the host determines whether there is an additional entry in the epoch E. If there is not an additional entry in the epoch E in the cache structure, then control flows to block 711. If there is an additional entry in the epoch E in the cache structure, then control returns to block 705.

At block 711, the host continues with managing the cache structure for new writes. For example, while the entries of epoch E are being fingerprinted, deduplicated, etc., the host can cache writes from application instances.

FIG. 8 is a flowchart of example operations for deduplicating cached writes and flushing the deduplicated writes to remote storage. FIG. 8 will again refer to the host as performing the example operations.

At block 801, the host detects a request to flush deduplicated cache writes to remote storage. The request may be from the operating system, a managing application (e.g., a cluster manager), a data management application (e.g., snapshot application), etc. The host can detect the request as an inter-process message, a network message, an interrupt, etc.

At block 803, the host determines cached write entries to be flushed for the request. The host determines which of the cached write entries fall within the flush boundaries corresponding to the request. For example, the host determines the cached write entries in the cache structure corresponding to a flush triggering epoch.

At block 805, the host generates a fingerprint for each of the write entries determined to be flushed. At block 807, the host compares the generated fingerprints against each other and against fingerprints of a fingerprint map. Based on the comparisons, the host determines which of the data units, if any, can be deduplicated based on data units of the cached write entries marked as dirty and available data units that have already been flushed to remote storage. The host can generate all of the fingerprints and then compare fingerprints. The host may have components that generate x fingerprints in parallel and compare pairs of the x fingerprints in parallel to determine matches among the compared fingerprints, before comparing the generated fingerprints against fingerprints of the fingerprint map. This can be considered a multi-pass comparison. Data units with fingerprints that are unique among the dirty data unit fingerprints can be identified, and then compared those unique fingerprints can be compared against the fingerprint map.

At block 809, the host updates a change set file with data units having unique fingerprints. If the host determines a data unit to have a fingerprint that is unique from the comparison against the currently generated fingerprints and previously generated fingerprints, then the host updates the change set file with the unique data unit.

At block 811, the host updates a fingerprint map based on the determination of unique and non-unique fingerprints and based on any update to the change set file. The host updates the fingerprint map to indicate any fingerprint(s) determined to be unique from the data units of the retrieved cache structure entries. The host also updates the fingerprint map to indicate the location within the change set file of the data unit corresponding to the unique fingerprint.

At block 813, the host maps targets of each retrieved write operation to a corresponding part of the change set file in accordance with the fingerprint map. The host maps a donor part of the change set file to a recipient file target. The host will insert an entry for each write operation retrieved from the cache structure.

At block 815, the host communicates a command to write the change set file into the remote, distributed storage. For example, the host generates and communicates an NFS write command, which can be a remote procedure call. The host could communicate a command to write the change set file in accordance any of a variety of protocols that support a distributed storage model.

At block 817, the host begins iterative operations for each mapped write target (i.e., for each donor-recipient pair). For example, the host traverses a structure that hosts the mapping of write targets to donor data units of the change set file.

At block 818, the host generates and communicates a request(s) to update write target metadata and/or deallocate storage of the write target. If a cached write causes an increase in the write target file size, then the host requests the remote storage system to update the metadata to accommodate the increased size. In addition to indicating a new size of the write target or additional size, the host may request that the remote storage system create one or more additional logical representations (e.g., file block numbers) to accommodate the addition to the write target file. The created logical representations will later be set to reference physical locations of the change set file within the remote storage system. If an existing unit of the write target will be updated to reference a physical location of the donor, then the host generates and communicates a request to deallocate the existing physical block of the write target. As described in FIG. 5, a technique of punching a hole in a file can be used.

At block 819, the host generates a command with parameters based on the mapping of the write target to the donor part of the change set file. For instance, the host can indicate a file handle of the change set file and location of the donor data unit within the change set file (e.g., offset) as source parameters for a share or copy command. The host can also indicate a file handle of the write target and location within the file at which the data unit is to be written as destination parameters for a copy or share. The command can be a remote procedure call for copying as defined by a protocol, such as the NFS protocol and relevant extensions that allow for sharing instead of copying.

At block 821, the host communicates the command to the remote storage. The host can send the command with the user datagram protocol (UDP) or transmission control protocol (TCP), as examples.

At block 823, the host determines whether there is an additional mapped write target. If there is an additional mapped write target, then control returns to block 817. Otherwise, control flows to block 825.

At block 825, the host generates an indication that the deduplicated host cache flush to remote storage has completed. This indication can be used to set flushed entries to "clean" and release the read only restriction on those entries, thus allowing reads from the clean entries. In addition, a write that hits a clean entry can update that clean entry and change it to a dirty entry.

Figure 9:
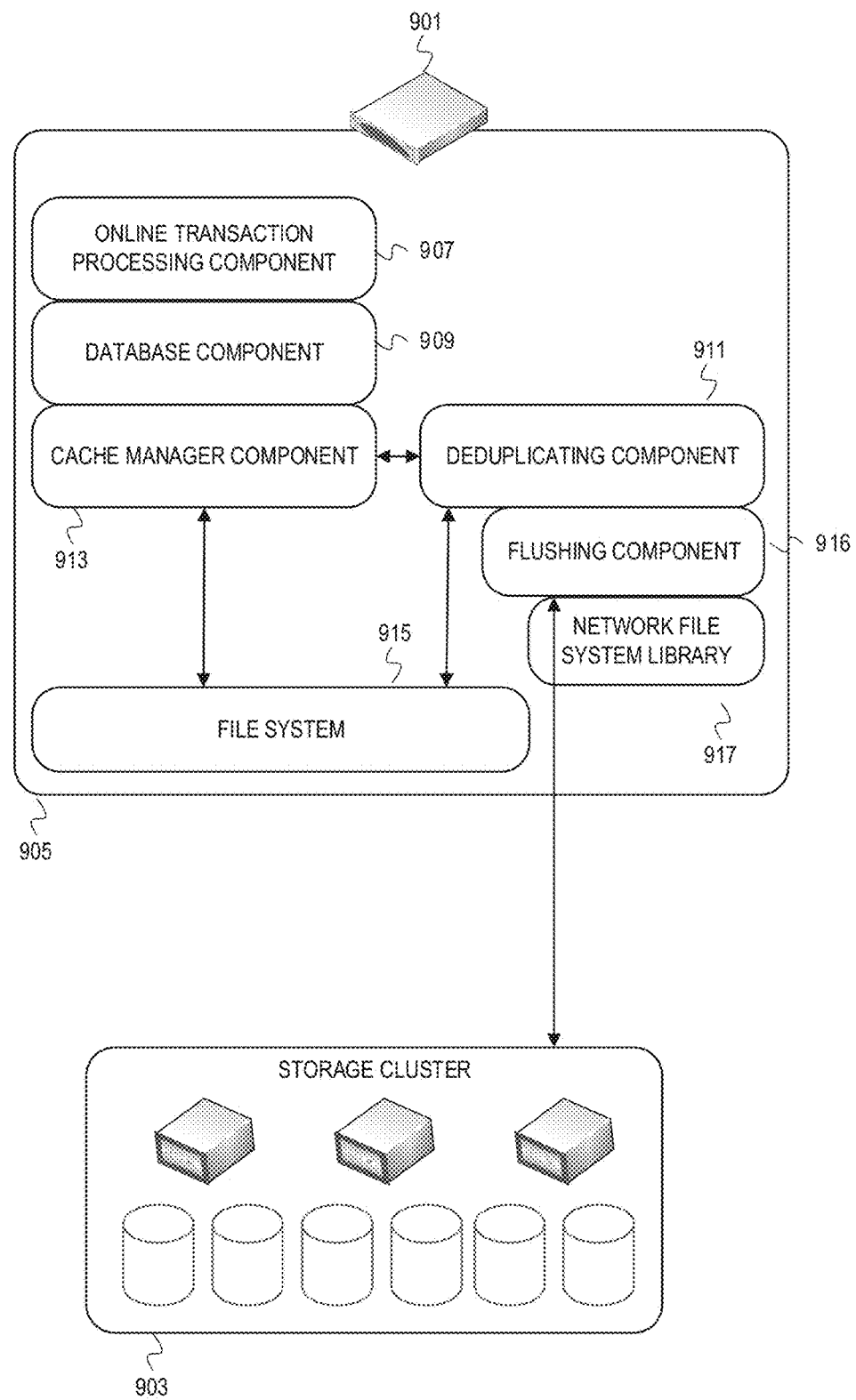
FIG. 9 depicts an example conceptual diagram of host component organization for host side deduplicated cached writes flushed to remote storage.

While the example flowcharts do not specify a structure for components installed/configured on a host, FIGS. 1-2 depicted a monolithic deduplicating cache manager that included components for particular aspects (e.g., the fingerprinting component). Since it was mentioned times that a different organization of components is possible, FIG. 9 depicts an example conceptual diagram of host component organization for host side deduplicated cached writes flushed to remote storage. In FIG. 9, a host 901 includes several components within an environment 905 of the host 901. The environment may be an operating system of the host 901, a virtualized environment of the host 901, etc. The host 901 is in communication with a storage cluster 903.

The environment 905 includes a stack of software components. The stack of software components includes an online transaction processing component 907, a database component 909, and a cache manager component 913. The environment 905 also includes a deduplicating component 911, a flushing component 916, and an NFS library 917. The online transaction processing component 907 interacts with the database component 909 to perform reads and writes to a database presented by the database component 909 to the online transaction processing component 907. The database component 909 reads and writes data to the file system 915. But the database component 909 either interacts with the file system 915 via the cache manager component 913 or interacts directly with the file system 915 while the cache manager component 913 observes the direct interactions and caches writes based on the observed interactions.

The cache manager component 913 interacts with the deduplicating component 911. As described earlier, the deduplicating component 911 retrieves cached writes from a cache managed by the cache manager component 913. In contrast to FIG. 1, FIG. 9 presents the deduplicating component 911 as including the fingerprinting functionality. The deduplicating component 911 interacts with the file system 915 and the flushing component 916. The deduplicating component 911 deduplicates for efficient cache flush to remote storage 903. The flushing component 916 generates a change set file and commands based on the deduplication by the deduplicating component 911. The flushing component 916 leverages the NFS library 917 to generate the commands, and sends those commands to the storage cluster.

Variations

The examples often refer to a "manager" or "component." A "manager" is a construct used to refer to implementation of functionality for managing host side cache as described herein. This construct is utilized since numerous implementations are possible. A manager may be referred to as a controller, supervisor, director, etc. The term is used to efficiently explain content of the disclosure. Although the examples refer to operations being performed by a manager, different entities can perform different operations. A particular entity employed can depend upon platform, program language, developer, customer requirements, etc.

In addition to a manager, this disclosure often refers to a component performing an operation. The components can be a software component or a hardware component. For instance, fingerprinting can be performed by a processor or application specific integrated circuit designed or configured to generate fingerprints or perform configurable hash functions. Deduplication can be performed an integrated circuit component that uses stages of logic gates to compare fingerprints or parts of fingerprints.

Example illustrations also referred to cache flush triggers that could be based on time or events. But host side cache flushes can be triggered by different types of triggers and not necessarily a single category of triggers. As an example, host side cache flushes may be triggered based on snapshots as mentioned earlier. But maintenance events or defined management events can trigger cache flushes in addition to the time based triggers. A host side cache flush can also be triggered based on performance thresholds (e.g., flush the host side cache more frequently if network issues are detected or if performance of the host falls below a threshold). Furthermore, an explicit cache flush command can be defined and invoked.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operation depicted in block 815 could be performed prior to the operation depicted in block 813 of FIG. 8. In addition, operations can be performed to coalesce commands of the cache writes. A host can determine if targets of cached writes are contiguous. If contiguous (e.g., contiguous file segments or contiguous blocks), the host can coalesce the commands into a single command that indicates one or more parts of the change set file as a donor(s) and the contiguous write target as a recipient for the share or copy to be performed by a remote, distributed storage system. For example, transmission of the individual commands can be postponed until the commands can be evaluated for possible coalescing. In that case, the example of a thousand commands may be substantially lower depending on degree of contiguity of recipients. If a command is constrained to indicate a single donor, then coalescing may also be conditioned on contiguous parts of the change set file as well as contiguous write target of cached writes. Referring to particular example illustrations, a host can coalesce commands prior to block 503 in FIG. 5 and prior to block 817 in FIG. 8. The host can traverse the flush map and determine those entries that can be coalesced. The host could examine entries for each recipient file and determine whether the write targets within the recipient file are contiguous. The host can, for example, select an entry that has the earliest file offset and then update the length to encompass the other write targets being coalesced. The other entries can then be marked for skipping, marked for removal, or removed. The host could then traverse the flush map of coalesced entries and generate the commands to be communicated to the remote storage system. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 10:
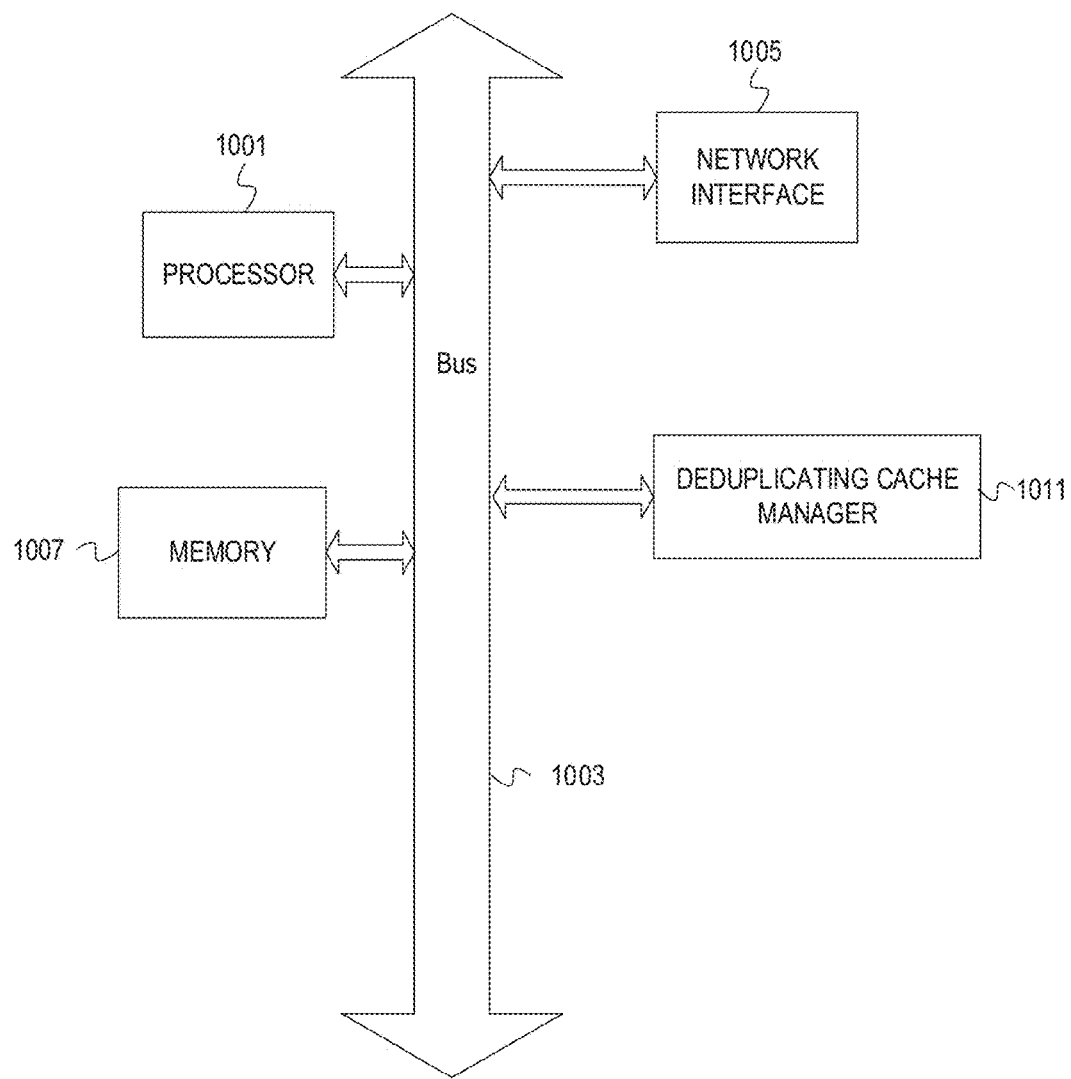
FIG. 10 depicts an example computer system with a deduplicating cache manager.

FIG. 10 depicts an example computer system with a deduplicating cache manager. The computer system includes a processor unit 1001 (possibly including multiple processors, multiple cores, multiple nodes, and/or implementing multi-threading, etc.). The computer system includes memory 1007. The memory 1007 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 1003 (e.g., PCI, ISA, PCI-Express, HyperTransport® bus, InfiniBand® bus, NuBus, etc.) and a network interface 1005 (e.g., a Fiber Channel interface, an Ethernet interface, an internet small computer system interface, SONET interface, wireless interface, etc.). The system communicates or transmits with remote devices via the network interface 1005 in accordance with a network protocol corresponding to the type of network interface, whether wired or wireless and depending upon the carrying medium. In addition, a communication or transmission can involve other layers of a communication protocol and or communication protocol suites (e.g., transmission control protocol, Internet Protocol, user datagram protocol, virtual private network protocols, etc.). The system also includes a deduplicating cache manager 1011. The deduplicating cache manager 1011 caches writes at a host device within cache flush boundaries. The cache flush boundaries can vary, can be static, can be dynamic, etc. The deduplicating cache manager 1011 deduplicates cached writes in response to detection of a cache flush boundary or trigger. After deduplicating the cache writes, the deduplicating cache manager 1101 transmits an aggregation of the unique data units of the cached writes, among the cached writes and possible previously cached writes, to a remote, distributed storage. The deduplicating cache manager 1101 then communicates copy commands for the individual cached writes that leverage the aggregation of unique data units. Any one of the previously described functionalities may be partially (or entirely) implemented in hardware and/or on the processor unit 1001. For example, the functionality may be implemented with an application specific integrated circuit, in logic implemented in the processor unit 1001, in a co-processor on a peripheral device or card, etc. Further, realizations may include fewer or additional components not illustrated in FIG. 10 (e.g., video cards, audio cards, additional network interfaces, peripheral devices, etc.). The processor unit 1001 and the network interface 1005 are coupled to the bus 1003. Although illustrated as being coupled to the bus 1003, the memory 1007 may be coupled to the processor unit 1001.

While the aspects of the disclosure are described with reference to various implementations and exploitations, it will be understood that these aspects are illustrative and that the scope of the claims is not limited to them. In general, techniques for efficiently flushing a host side cache of writes to remote, distributed storage as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

The disclosure allows for data to be shared or copied, regardless of the actual communicated command, when cached writes are flushed from a host to a remote storage system. A share conserves storage space in the remote storage system, but the claims are not limited to a sharing operation. In some cases, a remote storage system may not yet support a sharing operation. To avoid an arguable construction that "source" and "destination" limit the claims to copying instead of sharing, the claims use donor and recipient. The description uses the terms "donor" and "source" interchangeably and uses the terms "recipient" and "destination" interchangeably as seems to occur in relevant literature. The terms donor and recipient alone should not constrain the claims to either copying or sharing.

What is claimed is:

1. A method comprising:
    aggregating a set of data units, unique among data units of writes cached by a host in a cache, into a change set file;
    generating commands for the cached writes based on mappings between targets of the cached writes and locations of data units in the change set file; and
    communicating the change set file and the commands to a storage system, wherein a metadata update operation to modify metadata of a file targeted by a command to increase a size of the file is transmitted to the storage system, and wherein transmission of the command to the storage system is dependent upon the metadata update operation completing.

2. The method of claim 1, wherein the generating comprises:
    generating a first command which indicates a first data unit as a donor and a target of a first cached write as a recipient.

3. The method of claim 1, wherein the communicating comprises:
    communicating to a front end device of the storage system the commands for the cached writes based upon receiving confirmation that the change set file was stored by the storage system.

4. The method of claim 3, wherein the generating comprises:
    generating a first command which instructs the storage system to set metadata of a target for a first cached write to reference a location of a corresponding data unit in the change set file on the storage system.

5. The method of claim 1, wherein the aggregating and generating is triggered based upon a cache flush trigger of the cache.

6. The method of claim 1, comprising:
    caching writes in the cache by creating an entry within the cache for the write, wherein the entry is marked as dirty.

7. The method of claim 6, comprising:
    restricting, until after the change set file and the commands are communicated to the storage system, entries in the cache marked as dirty to read access based upon detecting a cache flush trigger.

8. The method of claim 1, wherein the metadata update operation allocates additional logical representations of data units for the file.

9. A non-transitory machine-readable medium comprising instructions, which when executed by a machine, causes the machine to:
    aggregate a set of data units, unique among data units of writes cached by a host in a cache, into a change set file;
    generate commands for the cached writes based on mappings between targets of the cached writes and locations of data units in the change set file; and
    communicate the change set file and the commands to a storage system, wherein a metadata update operation to modify metadata of a file targeted by a command to increase a size of the file is transmitted to the storage system, and wherein transmission of the command to the storage system is dependent upon the metadata update operation completing.

10. The non-transitory machine-readable medium of claim 9, wherein the instructions cause the machine to:
    generate a first command which indicates a first data unit as a donor and a target of a first cached write as a recipient.

11. The non-transitory machine-readable medium of claim 9, wherein the instructions cause the machine to:
    communicate to a front end device of the storage system the commands for the cached writes based upon receiving confirmation that the change set file was stored by the storage system.

12. The non-transitory machine-readable medium of claim 11, wherein the instructions cause the machine to:
    generate a first command which instructs the storage system to set metadata of a target for a first cached write to reference a location of a corresponding data unit in the change set file on the storage system.

13. A computing device comprising:
    a memory comprising machine executable code for performing a method; and
    a processor coupled to the memory, the processor configured to execute the machine executable code to cause the processor to:
        aggregate a set of data units, unique among data units of writes cached by a host in a cache, into a change set file;
        generate commands for the cached writes based on mappings between targets of the cached writes and locations of data units in the change set file; and
        communicate the change set file and the commands to a storage system, wherein a metadata update operation to modify metadata of a file targeted by a command to increase a size of the file is transmitted to the storage system, and wherein transmission of the command to the storage system is dependent upon the metadata update operation completing.

14. The computing device of claim 13, wherein the metadata update operation allocates additional logical representations of data units for the file.

15. The computing device of claim 13, wherein the machine executable code causes the processor to:
communicate to a front end device of the storage system the commands for the cached writes based upon receiving confirmation that the change set file was stored by the storage system.

16. The computing device of claim 15, wherein the machine executable code causes the processor to:
generate a first command which instructs the storage system to set metadata of a target for a first cached write to reference a location of a corresponding data unit in the change set file on the storage system.

17. The computing device of claim 13, wherein the aggregation and generation is triggered based upon a cache flush trigger of the cache.

18. The computing device of claim 13, wherein machine executable code causes the processor to:
cache writes in the cache by creating an entry within the cache for the write, wherein the entry is marked as dirty.

19. The computing device of claim 18, wherein the machine executable code causes the processor to:
restrict, until after the change set file and the commands are communicated to the storage system, entries in the cache marked as dirty to read access based upon detecting a cache flush trigger.

20. The computing device of claim 13, wherein the machine executable code causes the processor to:
generate a first command which indicates a first data unit as a donor and a target of a first cached write as a recipient.

* * * * *